Figure 1:
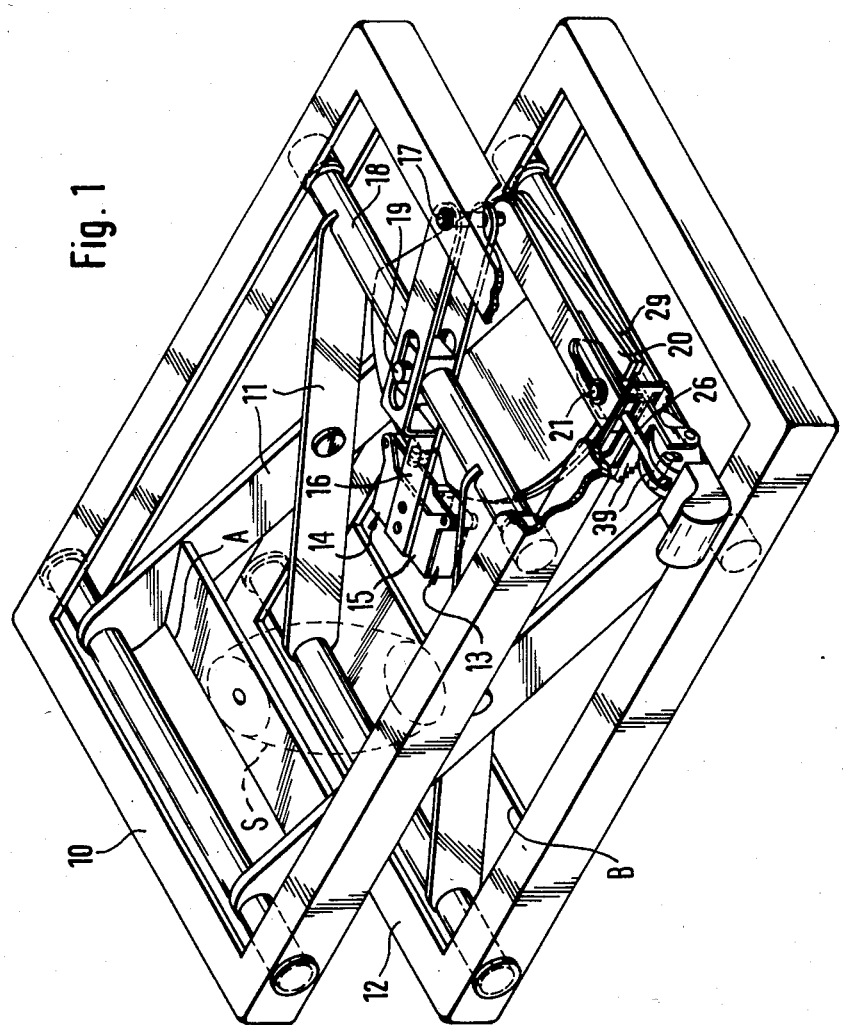

United States Patent [19]

Mischer

[11] Patent Number: 4,645,169

[45] Date of Patent: Feb. 24, 1987

[54] VEHICLE SEAT

[75] Inventor: Hans-Peter Mischer, Bad Meinberg

[73] Assignee: Gebr. Isringhausen, Lemgo, Fed. Rep. of Germany

[21] Appl. No.: 647,120

[22] Filed: Sep. 4, 1984

[30] Foreign Application Priority Data

Sep. 14, 1983 [DE] Fed. Rep. of Germany ....... 3333604

[51] Int. Cl.$^4$ ............................................. A01K 97/10
[52] U.S. Cl. .................................... 248/550; 248/563; 248/631
[58] Field of Search ............... 248/550, 564, 563, 562, 248/588, 631, 575, 585, 157, 430; 297/347, 339, 345, 338

[56] References Cited

U.S. PATENT DOCUMENTS

| | | | |
|---|---|---|---|
| 3,086,742 | 4/1963 | Severson | 248/575 |
| 4,213,594 | 7/1980 | Pietsch et al. | 248/550 |
| 4,397,440 | 8/1983 | Hall et al. | 248/550 |
| 4,461,444 | 7/1984 | Grassl et al. | 248/550 |
| 4,484,723 | 11/1984 | Meiller et al. | 248/550 |

Primary Examiner—Ramon O. Ramirez
Attorney, Agent, or Firm—Salter & Michaelson

[57] ABSTRACT

The invention concerns a vehicle seat having pneumatic suspension with automatic regulation of the seat height and an integrated height adjustment system. The height adjustment is designed in such a way that it can be used, even in the rest position of the vehicle seat, for the direct and precise setting of the selected static height of the seat. There is provided that, during the adjustment of the static height, tappet stops of control member are changed in such a way that during the adjustment process they render the valve tappets substantially free from play.

4 Claims, 7 Drawing Figures

VEHICLE SEAT

This invention relates to vehicle seats having pneumatic suspension with automatic regulation of the seat height and as known, for example, from U.S. Pat. No. 4,213,594. Hitherto the switch points for opening and closing the valves for the supply or removal of air are situated at a large distance below or above the prescribed static or mid-ride height so that actuation of the valves does not take place for every small movement of the seat about the static height such as occurs continuously during normal driving.

However, when the switch points for actuation of the valves are situated at a large distance below or above the static height it is not possible to adjust the static height in the rest position of the seat but this is normally adjusted during driving as the mean value after repeated actuation of the valves. This is disadvantageous since the vehicle seat ought to have the correct static height before driving begins.

It is desirable for the occupier of a vehicle seat with automatic height regulation of the type described above to be able to alter the static height of the seat and thus to select his individual seat height.

It is an object of the invention to provide, for vehicle seats having pneumatic suspension and automatic regulation of the seat height, an integrated system of height adjustment which makes it possible for the driver to adjust and also to alter the static height of the seat accurately while in the rest position, so that a selected change in static height can be produced automatically even when the seat is unoccupied.

According to an aspect of the invention a vehicle seat having pneumatic cushioning comprises a seat frame supported for up and down movement relative to a base frame by levers and by a pneumatic spring, and an automatic levelling device for maintaining the seat height at a predetermined static height independently of the weight of the occupant including an inlet valve for the supply of air to the pneumatic spring, an outlet valve for the pneumatic spring and a control member with two tappet members to actuate the valves, the valves being arranged in a common housing or on a common mounting plate and being movable relative to the control member by a coupling device connected to said support levers, so that, during up and down movement of the seat, movement above the static height causes the internal pressure of the pneumatic spring to be decreased by means of the outlet valve and movement of the seat below the static height causes the internal pressure to be increased by means of the inlet valve; wherein, in order to adjust the static height of the seat, the effective separation of the two tappet members of the control member relative to one another is adjustable so that an operating tappet of the air inlet valve and an operating tappet of the air outlet valve are rendered simultaneously substantially free from play relative to the tappet members of the control member, and wherein the setting of the control member about its pivot is adjustable by a manually-operated adjustment device.

In one arrangement there is included an auxiliary control member somewhat smaller than said control member and mounted parallel to, close to and coaxial with said control member on a common pivot, said control member having two tappet members for actuating the valves during normal operation of the seat, the auxiliary member having two tappet members which locate with the valve tappets to render them substantially free from play, the auxiliary member being able to freely pivot during normal use of the seat, and, to alter the static height of the seat, the auxiliary member being lockable relative to the control member in a position in which the tappet members of the auxiliary member are located between the tappet members of the control member. Conveniently a follower pin may be carried on an adjustment lever and by moving the follower pin into a locking slot in the control member and into a locking slot in the auxiliary member the control and auxiliary members are locked relative to one another and relative to the follower pin.

Alternatively the control member may be formed of two components one of which carries the tappet member for the air inlet valve and the other carries the tappet member for the outlet valve, the components being adjustable about a common pivot relative to one another, and during normal use of the seat the two components have a predetermined relatively large separation from one another, whereas, in order to change the static height of the seat the components are locked relative to one another in a position in which the tappet members of the components render the actuating tappets of the valves free from play. Conveniently a follower pin may be attached to an adjustment lever and by moving the follower pin into a locking slot in one component of the control member and into a locking slot of the other component of the control member the two components are locked relative to one another and to the follower pin.

According to a second aspect of the invention a vehicle seat having pneumatic cushioning comprises a seat frame supported for up and down movement relative to a base frame by levers and by a pneumatic spring and an automatic levelling device for maintaining the seat at a predetermined static height independently of the weight of the occupant and including an inlet valve for the supply of air to the pneumatic spring, an outlet valve for the pneumatic spring and a control member with two tappet members to actuate the valves, the control member being movable relative to the valve by coupling means connected to the seat frame levers so that movement of the seat frame above the static height causes the pressure in the pneumatic spring to decrease by acutation of the outlet valve and movement of the seat frame below the static height causes the pressure in the spring to be increased by actuation of the inlet valve, wherein to adjust the static height of the seat the effective spacing of the valves relative to one another is changed in such a way that the actuating tappets of the air inlet and outlet valves are rendered substantially without play relative to the tappet members of the control member, and either the basic setting of the two valves or the basic setting of the control member is adjustable by a manually operable adjustment device.

Figure 2:
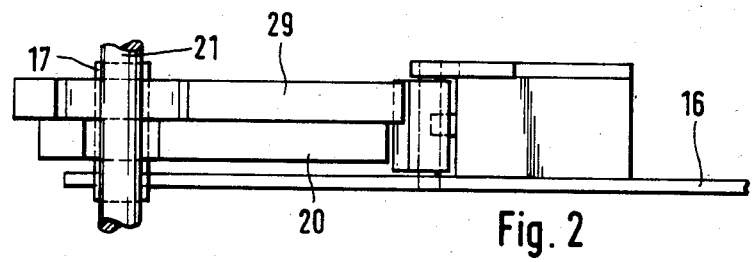
Figure 3:
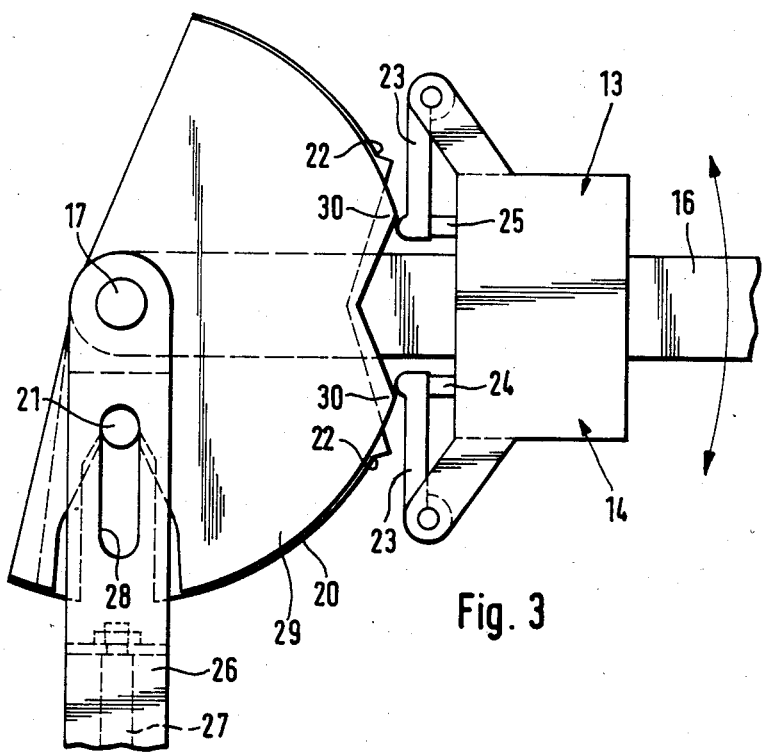
Figure 4:
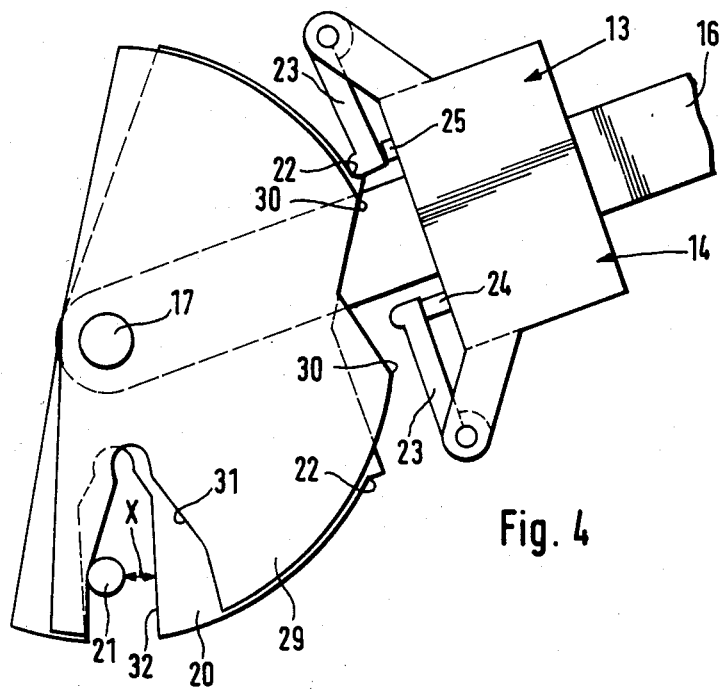
Figure 5:
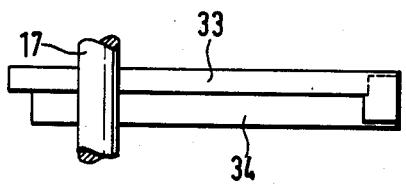
Figure 6:
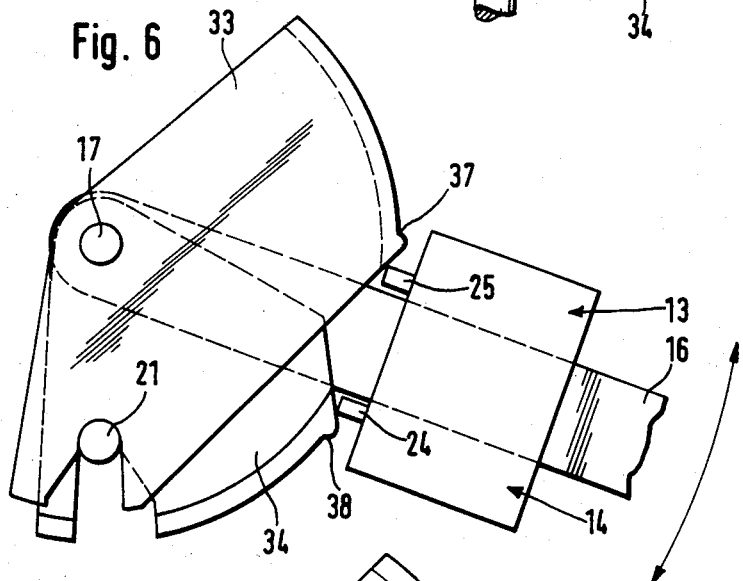
Figure 7:
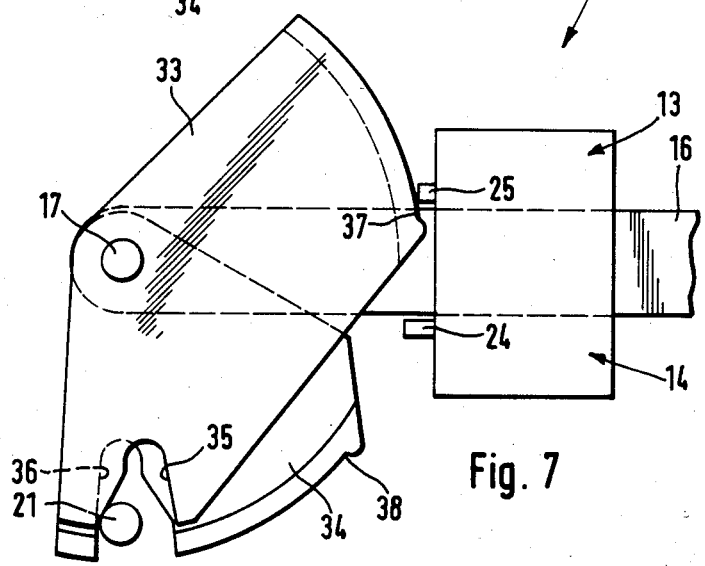

The invention will now be described with reference to embodiments described by way of example only and with reference to the drawings, in which:

FIG. 1 is a perspective view of the frame of a vehicle seat,

FIG. 2 is a side elevation of part of an adjustment mechanism of the seat frame, FIG. 3 is a plan view of the adjustment mechanism in FIG. 2 in one position, FIG. 4 is a plan view corresponding to FIG. 3 with the mechanism in another position, FIG. 5 is a side elevation corresponding to FIG. 2 of another embodiment of adjustment mechanism, FIG. 6 is a plan view of the mechanism of FIG. 5 in one position, and FIG. 7 is a plan view of the mechanism of FIG. 6 in another position.

Referring to the drawings and firstly to FIGS. 1-4 there is shown a seat frame 10 which carries a seat cushion (not shown) and which is supported by means of scissors linkage levers 11 attached to the frame 10 with an interposed pneumatic spring S (shown in phantom) that is tensioned between two cross plates, an upper cross plate A being welded on the scissors linkage levers 11 and a lower cross plate B being welded on a base frame 12 mounted on the body of the vehicle. Such a spring is illustrated in U.S. Pat. No. 4,213,594, referred to hereinabove. The pneumatic spring S includes a compressed air supply conduit and a compressed air outflow conduit (not illustrated) which are connected to compressed air valves (not shown) which are conventional in construction and operation. The internal pressure of the pneumatic spring is controlled by an air inlet valve 13 and an air outlet valve 14 which are located in a common valve housing.

The valve housing is attached to a valve plate 15 which is mounted to pivot by means of a plate guide 16 on a central pivot 17 and which is coupled to the support system of the seat by means of a coupling rod 18 and coupling bolts 19 and which is thus moved to and fro on a control member 20 which is in the form of a segment of a disc.

The control member 20 is trailed during the to and fro movement of the valves 13, 14 by means of a follower pin 21, held in a fixed position and, in particular, within the limits of the line x as seen in FIG. 4.

The control member 20, as seen in more detail in FIG. 4 has, in known manner, tappet stops or cams 22 with the locking grid on which the tappet arms or cam followers 23 of the valve tappets 24 and 25 are able to rotate insofar as the valve plate 15 with the valves 13 and 14 performs a to and fro movement about the central pin 17 corresponding with the movements of the seat frame, which is large enough to ensure that the valve arm 23 does not only force the control member 20 as far as the end position determined by the follower pin 21, but also rotates on the tappet stops 22.

For the purpose of adjustment of the static height the follower pin 21 is attached to an adjusting lever 26 (see FIG. 3) which is again mounted on the central pivot 17 so as to be capable of adjustment so that at the same time the follower pin 21 is guided in a slot 28 of the adjusting lever 26 by means of a push rod 27, in such a way that the follower pin 21 can be pushed towards or away from the central pivot 17. In FIG. 3 the follower pin is shown in its forward position, in FIG. 4 in its withdrawn position.

Parallel to the control member and coaxial with it there is mounted on the central pivot 17 an auxiliary member 29 also a segment of a disc and of somewhat smaller radius than the member 20. The member 29 has its own tappet stops 30 which are positioned so close together that they render the tappet arms 23 and thus valve tappets 24 and 25 substantially free from play (See FIG. 3). The tappet arms 23, which activate the valve tappets 25 and 24, are constructed to be broad enough to overlap both the control member 20 and also the auxiliary member 29 (see FIG. 2).

If the follower pin 21 is in its withdrawn position as in FIG. 4, then a locking slot 31 of the auxiliary member 29 ensures a large force-free play about the central pivot 17 so that the auxiliary member cannot interfere with the control member in any event nor exert a force on the valve arms 23. Thus in the withdrawn position of the follower pin 21 only the control member 20 is active.

If the follower pin 21 is now pushed into its forward position as shown in FIG. 3, then it moves into the locking slot 31 of the auxiliary member 29 as well as in the locking slot 32 of the control member 20 towards the head end of the locking slot 31 and, on reaching the head end, locks both the auxiliary member 29 relative to the control member 20 and also the control member 20 relative to the follower pin 21. The control member 20 with its tappet stops 22 is then in an inactive position and only the tappet stops 30 of the auxiliary member 29 are active and locate the tappet arms 23 or the valve tappets 24 and 25 free from play.

If now in the forward position of the following pin 21, the adjusting lever 26, which carries and guides the following pin 21, is pivoted about the central pivot 17 then actuation of the valve tappets 24 or 25 immediately occurs and adjustment of the static height of the vehicle seat in the desired manner upward or downward takes place. This adjustment of the static height and the immediate reaction of the air inlet or outlet valves occurs even when the vehicle seat is at rest and therefore the valves mounted on the plate guide 16 perform no up and down movement about the central pivot 17.

As soon as the adjusting lever 26 with the following pin 21 has reached its new adjusted position corresponding to the desired static height, the adjusting lever 26 is fixed in this new position by a device 39 as shown, and the following pin 21 is then moved back into its withdrawn position by means of the push rod 27. The vehicle seat is then positioned in its new selected static height and the auxiliary member 29 has again become inactive owing to the withdrawal of the follower pin 21, as described with reference to FIG. 4.

In the embodiment of the invention shown in FIGS. 5-7 valves 13 and 14 with valve tappets 24 and 25 are again arranged on the plate guide 16, which performs a to and fro movement about the central pivot 17 corresponding to the movements of the vehicle seat, as in the preceding embodiment.

However, in this arrangement, the control member consists of two components 33 and 34, which are both mounted to be pivotable about the central pivot 17 and which are able to be locked relative to one another and relative to the follower pin 21 by adjustment of the follower pin 21 towards its forward position (see FIG. 6). When the follower pin 21 is in its withdrawn position (see FIG. 7) the two components 33 and 34 can move apart within the limits of the locking slots 35 and 36 present in the two components.

The forward and withdrawal movements of the follower pin 21 and the adjustment of the follower pin 21 by the adjusting lever 26 take place in the same manner as described with reference to FIGS. 3 and 4.

In the FIGS. 5-7 embodiments the two components 33 and 34 of the control member have oppositely directed circumferential control edges so that, in effect, both the control edges of the components lie in the same plane so that the two control edges can act directly on the valve tappets 24 and 25.

In order to adjust the static height of the seat the two components 33 and 34 are locked relative to one another by pushing the follower pin 21 forward into the position shown in FIG. 6 so that the tappet stops 37 and 38 of the components locate the valve tappets 24 and 25 substantially free from play as shown in FIG. 6. FIG. 6 is thus comparable with FIG. 3 from the functional viewpoint.

In the withdrawn position of the follower pin 21 shown in FIG. 7 the components 33 and 34 have been moved outwards within the limits of their locking slots 35, 36. Where necessary support is given by an expanding spring (not shown) and the tappet stops 37 and 38 are situated at a distance from one another, as explained, for the normal operation of the control member. FIG. 7 thus corresponds to FIG. 4.

I claim:

1. A vehicle seat having pneumatic cushioning comprises a seat frame supported for up and down movement relative to a base frame by levers and by a pneumatic spring, and an automatic levelling device for maintaining the seat height at a predetermined static height independently of the weight of the occupant including an inlet value for the supply of air to the pneumatic spring, an outlet valve for the pneumatic spring and a control member with two tappet members to actuate the valves, the valves being arranged in a common housing or on a common mounting plate and being movable relative to the control member by a coupling device connected to said support levers, so that, during up and down movement of the seat, movement above the static height causes the internal pressure of the pneumatic spring to be decreased by means of the outlet valve and movement of the seat below the static height causes the internal pressure to be increased by means of the inlet valve, wherein, in order to adjust the static height of the seat, the effective separation of the two tappet members of the control member relative to one another is adjustable so that an operating tappet of the air inlet valve and an operating tappet of the air outlet valve are rendered simultaneously substantially free from play relative to the tappet members of the control member, and a manually-operated adjustment device for adjusting the setting of the control member about its pivot, an auxilliary control member somewhat smaller than said control member and mounted coaxial with said control member on a common pivot, said control member having two tappet members for actuating the valves during normal operation of the seat, the auxiliary member having two tappet members which locate with the valve tappets to render them substantially free from play, the auxiliary member being able to freely pivot during normal use of the seat, and, to alter the static height of the seat, the auxiliary member being lockable relative to the control member in a position in which the tappet members of the auxiliary member are located between the tappet members of the control member.

2. A vehicle seat according to claim 1 wherein the control member is formed of two components one of which carries the tappet member for the air inlet valve and the other carries the tappet member for the outlet valve, the components being adjustable about a common pivot relative to one another, and during normal use of the seat the two components have a predetermined relatively large separation from one another, whereas, in order to change the static height of the seat the components are locked relative to one another in a position in which the tappet members of the components render the actuating tappets of the valves free from play.

3. A vehicle seat according to claim 1 comprising a follower pin carried on an adjustment lever and by moving the follower pin into a locking slot in control member and into a locking slot in the auxiliary member the control and auxiliary members are locked relative to one another and relative to the follower pin.

4. A vehicle seat according to claim 2 comprising a follower pin attached to an adjustment lever and by moving the follower pin into a locking slot in one component of the control member and into a locking slot of the other component of the control member the two components are locked relative to one another and to the follower pin.

* * * * *